United States Patent
Cacace (10) Patent No.: US 6,497,174 B1
(45) Date of Patent: Dec. 24, 2002

(54) COOKING PAN FOR SAUTEING AND DEGLAZING

(76) Inventor: Chris Cacace, 2648 Colonial St., Yorktown Heights, NY (US) 10598

( * ) Notice: Subject to any disclaimer, the term of this patent is extended or adjusted under 35 U.S.C. 154(b) by 0 days.

(21) Appl. No.: 10/127,647

(22) Filed: Apr. 22, 2002

(51) Int. Cl.[7] .............................. A47J 37/00; A47J 43/00
(52) U.S. Cl. ........................................... 99/422; 99/395
(58) Field of Search ........................... 99/422–425, 395, 99/644, 345, 403, 324; 220/912, 573.1, 731, 676, 23.8, 661, 771; 126/390.1, 215

(56) References Cited

U.S. PATENT DOCUMENTS

| | | | | |
|---|---|---|---|---|
| 217,938 A | * | 7/1879 | Graves | 99/422 X |
| 754,310 A | * | 3/1904 | Horine | 99/422 X |
| 781,081 A | * | 1/1905 | MacFate | 126/390.1 |
| 1,398,655 A | * | 11/1921 | Smith | 99/422 X |
| 3,710,709 A | | 1/1973 | Roncarelli | |
| 4,462,388 A | * | 7/1984 | Bohl et al. | 126/390.1 |
| 4,574,777 A | * | 3/1986 | Bohl et al. | 99/425 X |
| 4,666,727 A | | 5/1987 | Wang | |
| D293,872 S | | 1/1988 | Wang | |
| 5,511,466 A | | 4/1996 | Dzibinski | |
| D380,934 S | | 7/1997 | Alarid, Jr. | |
| D381,555 S | | 7/1997 | Baker | |
| 6,237,470 B1 | * | 5/2001 | Adams | 99/422 |

* cited by examiner

Primary Examiner—Timothy F. Simone
(74) Attorney, Agent, or Firm—Law Office of Leo Zucker (57) ABSTRACT

A cooking pan has a bottom wall, and a side wall that extends upward about a cooking surface on the bottom wall. A handle is joined at one end to the side wall, and a lower portion of the side wall next to the cooking surface and opposite the handle is formed so that food pieces when on the cooking surface are propelled upward near the side wall when the handle is pulled backward. The side wall has a raised upper portion opposite the handle. A line drawn tangent to an inside surface of the raised upper portion at a top edge point of the upper portion, forms an angle of between two and ten degrees with respect to the normal direction of the cooking surface. When the pan is pulled back while cooking, the contents are propelled upward and directed to land in a forward region of the cooking surface further from the handle.

10 Claims, 2 Drawing Sheets

FIG.1

COOKING PAN FOR SAUTEING AND DEGLAZING

BACKGROUND OF THE INVENTION

1. Field of the Invention

This invention relates generally to configurations for cooking pans.

2. Discussion of the Known Art

Cooking food by sauteing calls for a small amount of fat such as butter or cooking oil to be applied on a heated cooking surface of a sturdy frying pan, and placing food pieces to be cooked on the fat when hot. Sauteing should not be confused with pan frying which calls for greater amounts of fat. See generally, Z. Camrass, "The Only Cookbook You'll Ever Need", Rand McNally (1977) at page 136.

Deglazing is a second step in a typical saute cooking recipe and relates to the discarding of unwanted fat. A common term used by chefs is "degrease and deglaze". While sauteing, some of the food pieces may stick or adhere to the bottom of the pan. This residue is called "fond". The fond is important to a good sauce which is prepared by adding a liquid to the pan during the deglazing step. Thus, deglazing includes adding a liquid such as wine, water or vegetable products to the pan once the fat has been discarded. The food pieces are then cooked further with the deglazing liquid to form the sauce. Because the deglazing liquid evaporates while being heated causing the sauce to thicken, the food pieces must continue to be mixed. Accordingly, the pan must be shaken frequently throughout the entire cooking process to ensure that all food pieces are cooked and deglazed uniformly.

Shaking the pan often also helps to make the temperature of the ingredients more uniform and spreads the heat about the pan. Most persons who use a saute pan generally use a forward and back motion. Persons may try to lift the front edge of the pan by snapping their wrist, in order to mix the ingredients more fully. Such wrist action causes some of the pan contents to fall out from the front of the pan and wind up on top of the stove, thus requiring a person afterward to clean the stove as well as the pan. Yet, to cook in virtually any pan without mixing the ingredients during the cooking process will cause uneven cooking, scorching or burning of some of the food ingredients.

In order to catch some food pieces that would otherwise fall on the stove while cooking with a saute pan, persons may attempt to move the pan quickly forward again after each forward and backward movement, making the cooking process more complex and tiresome. Notwithstanding good cooking skills acquired by some consumers as well as professionals at restaurants and other food service establishments, the available pans do not allow saute cooking without significant food waste and follow-up cleaning.

U.S. Pat. No. 1,398,655 (Nov. 29, 1921) discloses an egg turnover pan with an over-hanging lip opposite the pan handle. The pan is claimed to allow a partially cooked egg placed in the pan to be turned over by a jerking movement toward the user. Specifically, the pan has an overhanging lip opposite the pan handle, wherein the lip extends substantially parallel to the bottom of the pan. As demonstrated in Examples 12 and 24 set out later below, the pan construction of the '655 patent does not facilitate saute cooking of meat, vegetables, and other food pieces, however. In particular, the food pieces become stuck beneath the overhanging lip when the pan is drawn backward toward the user, rather than being mixed and "flipped" backward toward the center of the pan.

As far as is known, no pan configuration has been disclosed since the 1921 '655 patent for the purpose of redistributing food contents about a pan in response to a sudden backward movement of the pan while cooking. A saute pan configuration that will allow pieces of pasta, rice, vegetables, meats and the like to be cooked uniformly without spillage, would be highly desirable. A saute pan that facilitates regular mixing and redistribution of food pieces during cooking would also fulfill important commercial and consumer needs.

SUMMARY OF THE INVENTION

According to the invention, a cooking pan has a bottom wall forming a cooking surface, a side wall extending upward from the bottom wall, and an elongated handle joined at one end to the side wall. A lower portion of the side wall next to the cooking surface and opposite the handle is formed so that food pieces when placed on the cooking surface are urged against the lower portion and propelled upward near the side wall when the handle is moved suddenly backward.

The side wall also has an upper portion opposite the handle, and an inside surface of the upper portion has a profile in a plane that coincides with an axis of the handle and is substantially normal to the cooking surface. A line drawn tangent to the profile and substantially at a top edge point of the inside surface forms an angle of between 2 and 10 degrees with respect to the normal direction of the cooking surface. Food pieces propelled upward near the side wall when the handle is drawn backward, are directed by the upper portion of the wall to land within a forward region of the cooking surface further from the handle of the pan, rather than outside the pan or near the handle.

For a better understanding of the invention, reference is made to the following description taken in conjunction with the accompanying drawing and the appended claims.

DETAILED DESCRIPTION OF THE INVENTION

Figure 1:
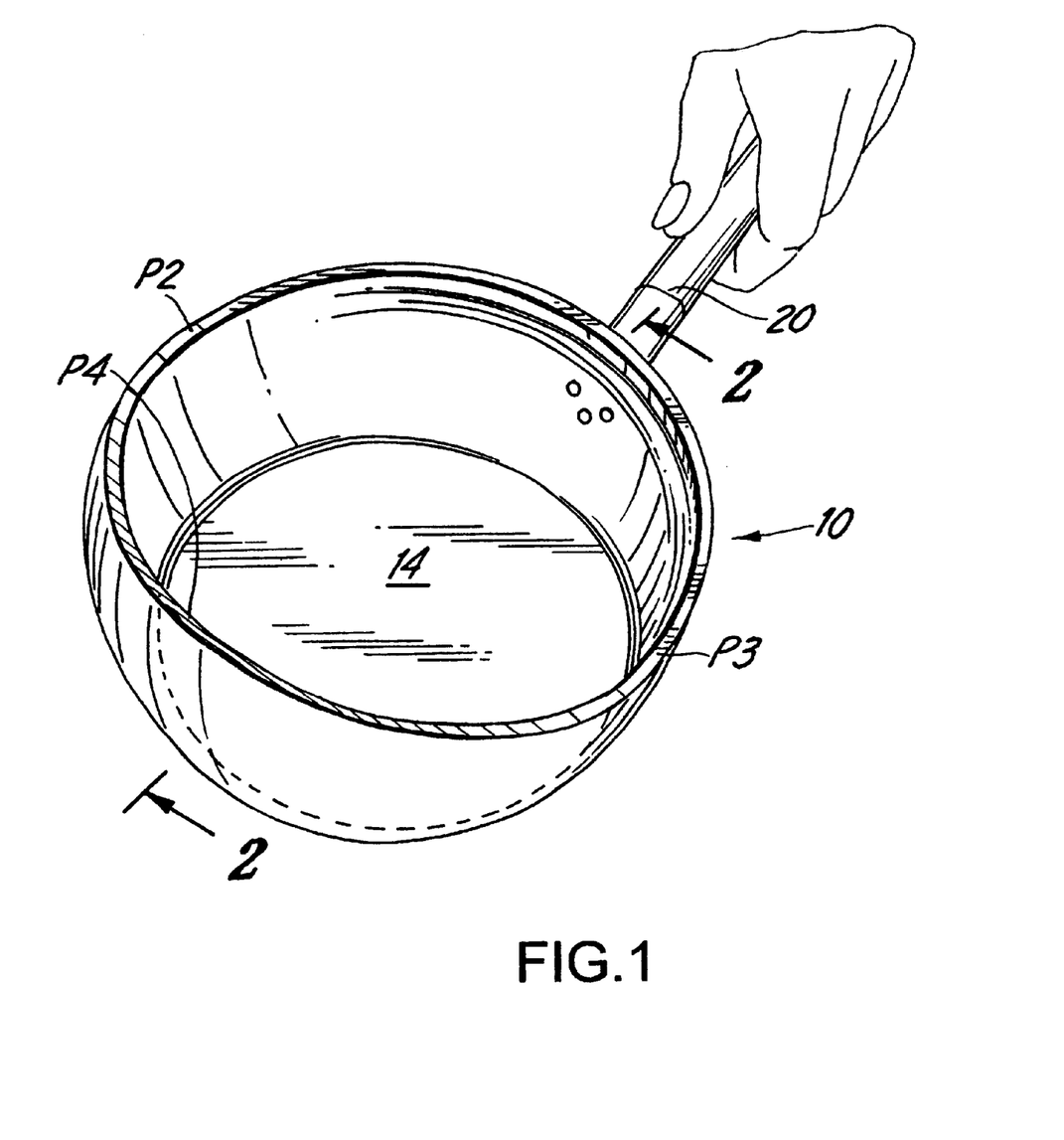
FIG. 1 is a perspective view of a cooking pan according to the invention.
Figure 2:
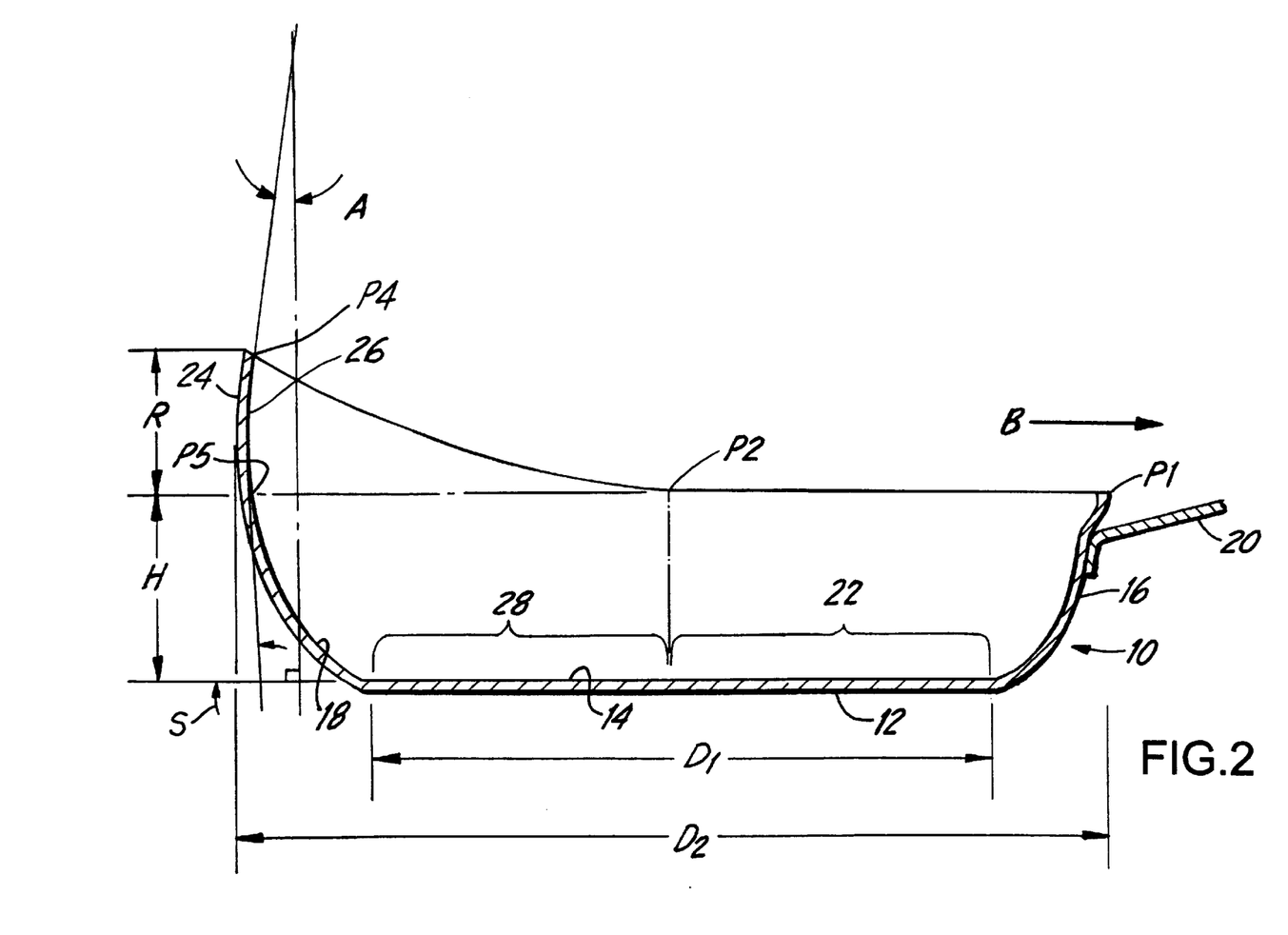
FIG. 2 is a cross-sectional view of the cooking pan as seen along section line 2—2 in FIG. 1 and in a plane normal to a cooking surface of the pan.

FIG. 1 shows a cooking pan 10 that is configured according to the invention. FIG. 2 is a cross-sectional view of the cooking pan 10 in FIG. 1.

Basically, the cooking pan 10 has a bottom wall 12 (FIG. 2) that defines a cooking surface 14. The cooking pan 10 may be made of any thermally conductive materials suitable for use in cooking utensils such as, e.g., aluminum, copper, stainless steel, and metal laminates. In the illustrated embodiment, the cooking surface 14 has a generally circular boundary with a diameter D1 of about, e.g., 7½ inches.

The cooking pan 10 also has a circular outer rim or side wall 16 that may be formed integrally with the bottom wall 12, and an elongated handle 20 that is fastened at one end to the side wall 16 as shown in the drawing. The side wall 16 extends upward from the periphery of the cooking surface 14, and has an overall outer diameter D2 of about, e.g., 12.0 inches. A lower portion 18 of the side wall next to the cooking surface 14 rises smoothly upward and away from the cooking surface boundary. The lower portion 18 is formed so that when the pan handle 20 is moved suddenly backward in the direction of arrow B in FIG. 2, pieces of food when placed on the food surface 14 are urged against the lower portion 18 and propelled upward near the side wall.

In the illustrated embodiment, the side wall 16 has a height H of about 2.0 inches as measured from the cooking surface 14 to a point P1 on a top edge of the wall 16 nearest the pan handle 20. The side wall 16 has a substantially uniform height as it extends 90 degrees in either direction from the point P1 to points P2, P3 to surround a rear region 22 of the pan cooking surface 14, closer to the handle 20. Beginning at the diametrically opposed points P2, P3, the top edge of the side wall rises further upward from the cooking surface 14 to a top edge point P4 diametrically opposite the handle 20. In the present embodiment, point P4 is located above the cooking surface 14 by an additional height R of, e.g., 1.5 inches beyond the height H of 2.0 inches, i.e., a total of 3.5 inches. The added height R of the point P4 is preferably about 0.75 times H. The upper portion 24 of the side wall extends from the points P2, P3 to surround a forward region 28 of the cooking surface 14, further form the handle 20.

An upper portion 24 of the side wall 16 opposite the handle 20 (point P1) has a cross-section as shown in FIG. 2 in a plane normal to the cooking surface 14 of the pan 10, which plane coincides with a long axis of the handle 20. The inside surface of the side wall 16 at a point P5 diametrically opposite the handle 20 and at the same height H as the point P1 above the cooking surface 14, has a slope S of preferably not more than 90 degrees with respect to the cooking surface 14.

As seen in FIG. 2, the upper portion 24 of the side wall has a curvilinear inside surface 26 that extends upward and radially inward of the pan 10. A line drawn tangent to the inside surface 26 in the vicinity of the top edge point P4 defines an angle A with respect to the normal direction of the cooking surface 14. In each of the following examples, the configuration of cooking pan 10 was adjusted so that a line drawn tangent to the inside surface 26 of the side wall upper portion in the region of the point P4, formed various angles A ranging between 0 and 90 degrees.

In a first group of examples (Examples 1–12), food pieces were initially distributed over the entire cooking surface 14 uniformly to a height of one inch. The pan was periodically moved forward, and quickly retracted a total of 10 times, and the results averaged. A second group of examples (Examples 13–24) were performed under the same conditions as the first group, except that the quantity of the food pieces was increased to an initial uniform height of 1½ inches over the cooking surface 14. In each of the examples, food mixes are identified by the following numbers:

| Number | Food Mix |
| --- | --- |
| 1 | Cooked rice with water to reheat. |
| 2 | Ziti, pasta with cream sauce and Parmesan cheese. |
| 3 | Chicken pieces with mushrooms, garlic, peppers and tomato sauce. |

Group I

EXAMPLE 1

Conventional 12-inch saute pan with an outer rim or side wall formed with a constant height (H) of 2.0 inches about the entire cooking surface.

| Food Mix | Results |
| --- | --- |
| 1 | Some rice spilled out the front of the pan, about 15% of the contents. |
| 2 | Some pasta and sauce spilled out of the front of the pan, about 10% of the contents. |
| 3 | Some chicken and vegetables spilled out of the front of the pan, about 10% of contents. |

EXAMPLE 2

The present pan 10 of FIGS. 1 and 2, configured so that A=0 degrees.

| Food Mix | Results |
| --- | --- |
| 1 | Some rice spilled out of the front of the pan, but less than with the conventional saute pan of Example 1; less than 10% of the contents. |
| 2 | Some pasta and sauce spilled out of the front of the pan, but less than with the conventional saute pan of Example 1; slightly more than 5%. |
| 3 | Some chicken and vegetable mix spilled out of the front of the pan. Less than with the conventional saute pan of Example 1; slightly less than 5%. |

EXAMPLE 3

The pan 10 configured so that A=5 degrees.

| Food Mix | Results |
| --- | --- |
| 1 | Substantially all of the rice remained in the pan. |
| 2 | All of the pasta remained in the pan. |
| 3 | All of the chicken and sauce remained in the pan. |

EXAMPLE 4

The pan 10 configured so that A=10 degrees.

| Food Mix | Results |
| --- | --- |
| 1 | All of the rice remained in the pan. |
| 2 | All of the pasta and sauce remained in the pan. |
| 3 | All of the chicken and sauce remained in the pan. |

EXAMPLE 5

The pan 10 configured so that A=15 degrees.

| Food Mix | Results |
| --- | --- |
| 1 | All of the rice remained in the pan. |
| 2 | All of the pasta and sauce remained in the pan. |
| 3 | All of the chicken and sauce remained in the pan. |

EXAMPLE 6

The pan 10 configured so that A=20 degrees.

| Food Mix | Results |
|---|---|
| 1 | All of the rice remained in the pan, but some was directed far backward on the rear half-region 22 of the cooking surface 14, close to the handle 20. |
| 2 | All of the pasta remained in the pan, with small amounts being directed close to the handle 20. |
| 3 | All of the chicken and sauce remained in the pan. |

EXAMPLE 7

The pan 10 configured so that A=25 degrees.

| Food Mix | Results |
|---|---|
| 1 | Most of the rice remained in the pan, with nearly 5% landing on the handle 20. |
| 2 | Most of the pasta remained in the pan but some sauce landed outside near the handle 20. |
| 3 | Most of the chicken and sauce remained in the pan, but some sauce landed outside near the handle 20. |

EXAMPLE 8

The pan 10 configured so that A=30 degrees.

| Food Mix | Results |
|---|---|
| 1 | Most of the rice remained in the pan, but some of the liquid and rice landed outside in the area of the handle 20 in a slightly greater amount than with A = 25 degrees in Example 7. |
| 2 | Most of the pasta remained in the pan, but about 4–5% landed outside in the handle area. The movement of the pasta and sauce caused a splash of the sauce mixture to get slightly out of control when it came out onto the handle area. |
| 3 | Most of the chicken and sauce remained in the pan, but a small amount landed outside in the handle area. A small amount of sauce splashed out onto the user's arm. |

EXAMPLE 9

The pan 10 configured so that A=35 degrees.

| Food Mix | Results |
|---|---|
| 1 | Most of the rice remained in the pan but some of the liquid and rice landed on the handle 20 in a larger amount and at a faster speed than with the pan of Example 8. |
| 2 | Most of the pasta remained in the pan but more than 5% landed outside in the handle area with a force out of control of the pan. The pasta and sauce splashed against the inside surface 26 of the pan wall. In some instances pieces of pasta and sauce landed on the user's arm near the elbow. There was also spattering of sauce on the user's chef jacket in the areas of the upper stomach and lower chest. |
| 3 | Most of the chicken and sauce remained in the pan. Pieces of chicken, vegetables and sauce were directed out onto the handle area. The same splashing effect as with the pasta was experienced. Some sauce splashed on the user's arm and some on the stomach-chest area. |

EXAMPLE 10

The pan 10 configured so that A=45 degrees.

| Food Mix | Results |
|---|---|
| 1 | Most of the rice and liquid mix remained in the pan, but a fairly large amount (more than 15%) left the pan and was directed to land on the user. |
| 2 | Most of the pasta and sauce mix remained in the pan, but more than 15% left the pan on the side of the handle 20, onto the user's arm and coat. The splashing effect is greater than in previous examples and some of the sauce traveled back at an alarming rate. |
| 3 | Most of the chicken and sauce mix remained in the pan. More than 15% left the pan on the side of handle 20, similar to the pasta mix 2. The splashing effect increased the velocity of the sauce that traveled backward at the user. |

EXAMPLE 11

The pan 10 configured so that A=60 degrees.

| Food Mix | Results |
|---|---|
| 1 | Most of the rice and liquid mix remained the pan. More than 5% landed outside at the handle area, but less than in Exampie 10 (A = 45 degrees). |
| 2 | Most of the pasta sauce mix remained in the pan. The splashing effect was still evident but not to the degree as in Example 10. There was a slight popping noise as if some of the mixture was trapping the air in the region of the inside surface 26. More than 5% of the mix left the pan and landed in the handle area, but not nearly as much as in Example 10. More of the pasta mix landed in the handle area than did the rice mixture 1. |
| 3 | Most of the chicken and sauce mixture remained in the pan. The sauce splashed out onto the handle 20, but the chicken and vegetable mix did not. |

EXAMPLE 12

The pan 10 configured so that A=90 degrees. The angle corresponds to the configuration of the earlier mentioned U.S. Pat. No. 1,398,655 egg turnover pan.

| Food Mix | Results |
|---|---|
| 1 | Almost all of the rice and liquid remained in the pan but it became evident that it did not have enough room to move away from the inside surface 26. A small amount of rice left the pan to land on the handle 20, but much less than in Example 11 with A = 60 degrees. |

-continued

| Food Mix | Results |
| --- | --- |
| 2 | Most of the pasta and sauce mix remained in the pan, but was also stuck under the inside surface 26 of the pan. Small amounts left the pan to land on the handle area. |
| 3 | Most of the chicken and sauce mixture remained in the pan, and also stuck under the inside surface 26 of the pan. Some small amounts left the pan to land at the handle area. |

Group II

EXAMPLE 13

Conventional 12-inch saute pan; food mix depth increased initially to uniform height of 1½ inches in all the following examples.

| Food Mix | Results |
| --- | --- |
| 1 | Some rice spilled out of the front of the pan; more than 15% of contents. |
| 2 | Some pasta and sauce spilled out of the front of the pan, less than 15% of contents. |
| 3 | Some chicken and vegetables spilled out of the front of the pan, less than 15% of the contents. |

EXAMPLE 14

The present pan 10 configured so that A=0 degrees.

| Food Mix | Results |
| --- | --- |
| 1 | Some rice and fluid spilled out of the front of the pan, less than 15% of contents. |
| 2 | Some pasta and sauce spilled out of the front of the pan, less than 10% of contents. |
| 3 | Some chicken and vegetable mix spilled out of the front of the pan, less than 10% of contents. |

EXAMPLE 15

The pan 10 configured so that A=5 degrees.

| Food Mix | Results |
| --- | --- |
| 1 | Almost all of the rice remained in the pan. |
| 2 | All of the pasta and sauce remained in the pan. |
| 3 | All of the chicken and sauce remained in the pan. |

EXAMPLE 16

The pan 10 configured so that A=10 degrees.

| Food Mix | Results |
| --- | --- |
| 1 | All of the rice and fluid remained in the pan. |
| 2 | All of the pasta and sauce remained in the pan. |
| 3 | All of the chicken and sauce remained in the pan. |

EXAMPLE 17

The pan 10 configured so that A=15 degrees.

| Food Mix | Results |
| --- | --- |
| 1 | All of the rice remained in the pan, but some rice landed far back in the rear half-region 22 of the cooking surface 14, near the handle 20. |
| 2 | All of the pasta and sauce remained in the pan, although the mix approached the handle 20 closer than in Example 5. |
| 3 | All of the chicken and sauce remained in the pan, although the mix approached the handle 20 closer than in Example 5. |

EXAMPLE 18

The pan 10 configured so that A=20 degrees.

| Food Mix | Results |
| --- | --- |
| 1 | Most of the rice remained in the pan, but some left the pan and landed in the handle area, less than 5%. |
| 2 | Most of the pasta remained in the pan, but some landed in the handle area, less than 5%. |
| 3 | Most of the chicken and sauce remained in the pan, but some of the mix came out, less than 5%. |

EXAMPLE 19

The pan 10 configured so that A=25 degrees.

| Food Mix | Results |
| --- | --- |
| 1 | Most of the rice remained in the pan, but more than 5% came out onto the handle area |
| 2 | Most of the pasta remained in the pan, but more than 5% came out onto the handle area. |
| 3 | Most of the chicken and sauce remained in the pan, but more than 5% of the mix came out onto the handle area. |

EXAMPLE 20

The pan 10 configured so that A=30 degrees.

| Food Mix | Results |
| --- | --- |
| 1 | Most of the rice remained in the pan, but more than 10% was directed back at the user with increased velocity. |
| 2 | Most of the pasta remained in the pan. Less than 10% was directed out of the pan with increased velocity, landing on the user's arm and lower chest area. |
| 3 | Most of the chicken and sauce remained in the pan, but less than 10% came out with increased velocity landing on the user's arm and lower chest area. |

EXAMPLE 21

The pan 10 configured so that A=35 degrees.

| Food Mix | Results |
|---|---|
| 1 | Most of the rice remained in the pan, but some of the mix landed out onto the handle area with high velocity. Some landed on the user's arm up to the elbow some on the lower chest. |
| 2 | Most of the pasta remained in the pan, but more than 10% was directed out onto the handle area, and onto the user's arm and lower chest. |
| 3 | Most of the chicken and sauce remained in the pan, but more than 10% landed in the handle area and on the user's arm and lower chest. |

EXAMPLE 22

The pan 10 configured so that A=45 degrees.

| Food Mix | Results |
|---|---|
| 1 | Most of the rice mix did remain in the pan, but more than 15% came out onto the handle area, and the user's arm and lower and upper chest. The same increase in velocity of the food mix was observed as in Example 10. |
| 2 | Most of the pasta and sauce mix remained in the pan. More than 15% came out onto the handle area, the user's arm and lower and upper chest. |
| 3 | Most of the chicken and sauce mix remained in the pan. More than 15% came out onto the handle area, as well as on the user's arm and upper and lower chest. Some sauce even landed on the user's face. |

EXAMPLE 23

The pan 10 configured so that A=60 degrees.

| Food Mix | Results |
|---|---|
| 1 | Most of the rice mix remained in the pan. Less than 5% came out onto the handle area, and not as much as in the 45 degree (Example 22) pan. |
| 2 | Most of the pasta and sauce mix remained in the pan. Less than 5% came out to land in the handle area. |
| 3 | Most of the chicken and sauce mix remained in the pan. Less than 5% landed in the handle area. |

EXAMPLE 24

The pan 10 configured so that A=90 degrees. The angle corresponds to the configuration of the earlier mentioned U.S. Pat. No. 1,398,655 egg turnover pan.

| Food Mix | Results |
|---|---|
| 1 | Almost all of the rice and liquid remained in the pan. The ingredients became stuck under the inside surface 26, and mixing of the ingredients was prevented. |
| 2 | Almost all of the pasta and sauce mix remained in the pan, but could not be mixed because of the inside surface 26 beneath which the ingredients became stuck. |

| Food Mix | Results |
|---|---|
| 3 | Almost all of the chicken and sauce mix remained in the pan. The mixture could not be mixed as it became stuck under the inside surface 26 of the pan. |

In view of the foregoing results, a preferred range of angles for the angle A in the present cooking pan 10 is between two and ten degrees. Further, an angle A of between five and seven degrees should be close to if not optimum for most saute cooking since, based on the obtained results, such an angle will direct the food pieces almost entirely back onto the forward region 28 of the cooking surface, with few if any pieces landing further back in the rear region 22 of the cooking surface near the handle 20.

Forming the angle A between two and ten degrees allows the rear region 22 to act as a "barrier" at the back (handle) end of the pan 10, to maintain the food pieces in the pan and keep them from falling on the stove all through the cooking process. The present pan configuration is easy to use, and most persons will find that the contents will not be thrown out onto the stovetop as occurs when cooking with existing saute pans.

The examples also show that when the angle A approaches 20 degrees, food pieces are propelled back too far onto the rear half-region 22 of the cooking surface for such angle to be useful and safe when thrusting the pan forward and back while cooking. As food is propelled further toward the handle 20 (and user), a danger exists wherein hot food pieces could land on the user's hand or other portions of his/her body. An angle A of between five and seven degrees will cause food pieces to be propelled only minimally (if at all) near the handle 20, thus avoiding such danger when saute cooking with the pan 10.

The Group I examples used a pan which was half full. The Group II examples used a pan that was three-quarters full. With respect to the values set for the angle A of the pan 10, the results tend to be similar for the two groups. Specifically, once the angle A exceeds 20 degrees, the mixture of food is propelled backward too far toward the handle 20. The increased depth of the pan contents in Group II forced the food pieces to be propelled further for lesser values of angle A than in Group I.

The present cooking pan 10 will enable persons having little cooking skill as well as professionals to mix and redistribute food pieces about the pan with ease while sauteing, and with much less waste and follow-up cleaning than with the conventional pans.

While the foregoing description represents preferred embodiments of the invention, it will be obvious to those skilled in the art that various modifications may be made without departing from the spirit and scope of the invention pointed out by the following claims.

I claim:

1. A cooking pan, comprising:
a bottom wall that defines a bounded cooking surface;
a side wall, wherein a lower portion of the side wall extends upward from the boundary of the cooking surface on the bottom wall, and the side wall has an inside surface having a curvilinear profile in a plane that is normal to the cooking surface;
an elongated handle having an axis and joined at one end at a first point on the side wall, and the cooking surface has a rear region that is closer to the handle and a forward region that is further from the handle;

the lower portion of the side wall opposite the handle in the direction of the handle axis, has said curvilinear profile formed so that food pieces on the cooking surface are propelled upward near the side wall when the handle is pulled backward to direct the food pieces against the inside surface of the lower portion of the side wall;

an upper portion of the side wall has a top edge that rises upward from the cooking surface from second and third points on the top edge, to a fourth point on the top edge which is opposite the first point on the side wall in the direction of the handle axis; and a line drawn tangent to said curvilinear profile substantially at said fourth point forms an angle of between 2 and 10 degrees with respect to the normal direction of the cooking surface wherein the food pieces that are propelled upward near the side wall opposite the handle when the handle is pulled backward, are directed by the upper portion of the side wall to land substantially within the forward region of said cooking surface.

2. The cooking pan of claim 1, wherein the side wall extends about the rear region of the cooking surface at a uniform first height, said fourth point is at a second height above the forward region of the cooking surface, and said second height is about 1.75 times said first height.

3. The cooking pan of claim 1, wherein said line drawn tangent to said curvilinear profile substantially at said fourth point, forms an angle of between 5 and 7 degrees with respect to the normal direction of the cooking surface.

4. The cooking pan of claims 3, wherein the side wall surrounds the rear region of the cooking surface at a uniform first height, said fourth point is at a second height above the forward region of the cooking surface, and said second height is about 1.75 times said first height.

5. The cooking pan of claim 2, wherein the first height is about 2.0 inches and the second height is about 3.75 inches.

6. The cooking pan of claim 4, wherein the first height is about 2.0 inches and the second height is about 3.75 inches.

7. The cooking pan of claim 1, wherein the cooking surface has a generally circular boundary.

8. The cooking pan of claim 7, wherein the cooking surface has a diameter of about 7½ inches.

9. The cooking pan of claim 7, wherein the second and the third points are each located at about 90 degrees in either direction from the first point on the side wall.

10. The cooking pan of claim 1, wherein a fifth point on the curvilinear profile of the inside surface of the side wall has a slope of less than 90 degrees with respect to the cooking surface, and said fifth point is opposite the handle in the direction of the handle axis and at the same height as said first point above the cooking surface.

* * * * *

(12) EX PARTE REEXAMINATION CERTIFICATE (8910th) United States Patent
Cacace (10) Number: US 6,497,174 C1
(45) Certificate Issued: Mar. 20, 2012

(54) COOKING PAN FOR SAUTEING AND DEGLAZING

(76) Inventor: Chris Cacace, Yorktown Heights, NY (US)

Reexamination Request:
No. 90/009,925, Jul. 14, 2011

Reexamination Certificate for:
Patent No.: 6,497,174
Issued: Dec. 24, 2002
Appl. No.: 10/127,647
Filed: Apr. 22, 2002

(51) Int. Cl.
*A47J 37/10* (2006.01)

(52) U.S. Cl. .......................................... 99/422; 99/395

(58) Field of Classification Search ................. None
See application file for complete search history.

(56) References Cited

To view the complete listing of prior art documents cited during the proceeding for Reexamination Control Number 90/009,925, please refer to the USPTO's public Patent Application Information Retrieval (PAIR) system under the Display References tab.

*Primary Examiner* — Terrence Till (57) ABSTRACT

A cooking pan has a bottom wall, and a side wall that extends upward about a cooking surface on the bottom wall. A handle is joined at one end to the side wall, and a lower portion of the side wall next to the cooking surface and opposite the handle is formed so that food pieces when on the cooking surface are propelled upward near the side wall when the handle is pulled backward. The side wall has a raised upper portion opposite the handle. A line drawn tangent to an inside surface of the raised upper portion at a top edge point of the upper portion, forms an angle of between two and ten degrees with respect to the normal direction of the cooking surface. When the pan is pulled back while cooking, the contents are propelled upward and directed to land in a forward region of the cooking surface further from the handle.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

\* \* \* \* \*